(12) United States Patent
Yamauchi

(10) Patent No.: US 7,974,187 B2
(45) Date of Patent: Jul. 5, 2011

(54) DATA TRANSMISSION

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 12/403,079

(22) Filed: Mar. 12, 2009

(65) Prior Publication Data

US 2009/0238067 A1    Sep. 24, 2009

(30) Foreign Application Priority Data

Mar. 19, 2008  (JP) .................. 2008-071542

(51) Int. Cl.
*H04L 12/26* (2006.01)
(52) U.S. Cl. ........................... 370/226; 370/243
(58) Field of Classification Search .......... 370/216–228, 370/242, 243, 246–249; 340/825.01; 714/4
See application file for complete search history.

(56) References Cited

U.S. PATENT DOCUMENTS

| | | | | |
|---|---|---|---|---|
| 6,134,036 | A * | 10/2000 | Andreozzi et al. ................ | 398/1 |
| 6,269,452 | B1 * | 7/2001 | Daruwalla et al. ............... | 714/4 |
| 2002/0172150 | A1 * | 11/2002 | Kano ............................ | 370/216 |
| 2003/0026203 | A1 * | 2/2003 | Manganini et al. ........... | 370/221 |
| 2003/0067871 | A1 * | 4/2003 | Busi et al. .................... | 370/222 |
| 2006/0250986 | A1 * | 11/2006 | Alharbi et al. ................ | 370/258 |
| 2007/0081451 | A1 * | 4/2007 | Fujimori et al. ............. | 370/227 |
| 2007/0206618 | A1 * | 9/2007 | Zelig et al. .................... | 370/404 |

FOREIGN PATENT DOCUMENTS

| | | |
|---|---|---|
| JP | 2001045036 A | 2/2001 |
| JP | 2005151558 A | 6/2005 |
| JP | 2006080888 A | 3/2006 |
| JP | 2006287425 A | 10/2006 |

* cited by examiner

*Primary Examiner* — Ricky Ngo
*Assistant Examiner* — Gary Mui

(57) ABSTRACT

In a data transmission system having a plurality of transmitters connected in a ring configuration, a band monitoring unit in each of the plurality of transmitters monitors the bandwidths of a first and a second transmission path between one of the transmitters that comprise the ring and a first and a second transmitter on both sides of said transmitter, respectively. A protection execution unit executes protection processing by setting up a bypass path for each of the first and second transmission paths. Further, when the bandwidth of the first or second transmission path acquired by the band monitoring unit decreases below a threshold, and only when any one of the transmitters comprising the ring and the other transmitters is not executing protection processing, the protection execution unit executes protection processing for the first or second transmission path which is determined to have a bandwidth smaller than the threshold.

12 Claims, 9 Drawing Sheets

DATA TRANSMISSION

This application is based upon and claims the benefit of priority from Japanese Patent Application No. 2008-071542 filed on Mar. 19, 2008, the content of which is incorporated by reference.

BACKGROUND OF THE INVENTION

1. Field of the Invention

The present invention relates to a data transmission system which includes a plurality of transmitters connected to a transmission path of SDH (Synchronous Digital Hierarchy)/SONET (Synchronous Optical NETwork) in a ring configuration.

2. Description of the Related Art

RPR (Resilient Packet Ring) is drawing attention as a technology for increasing the availability of networks which are configured to conform to SDH/SONET. RPR is defined in 802.17 recommended by IEEE (Institute of Electrical and Electronic Engineers), and is capable of transmitting packets in a high bandwidth such as 2.4 Gbps, 10 Gbps or the like.

Referring to FIG. 1, a data transmission system disclosed in JP-2006-80888A is shown, where the system comprises RPR devices 90-94, layer-3 switch (hereinafter labeled "L3SW") 96, and terminal 97.

RPR devices 90-94 are connected in a ring configuration through radio transmission path 95. Also, each of RPR devices 90-94 is connected to a plurality of terminals 97 through L3SW 96.

Radio transmission path 95 comprises full-duplex transmission lines, where each transmission line is comprised of eight channels in total, each of which having a bandwidth of 6 Mbps.

Terminal 97 is a terminal which has a MAC (Media Access Control) address or an IP (Internet Protocol) address. For example, terminal 97 may be a personal computer, an IP telephone or the like.

RPR device 91 forwards frames received on each channel (from channel 1 to channel 8) from RPR device 90 to RPR device 92. Also, RPR device 91 detects a fault based on the frame reception situation on each channel (from channel 1 to channel 8) from RPR device 90.

When the occurrence of faults is detected on one-half (four channels) or less of all channels (eight channels), RPR device 91 notifies RPR device 90, which is the source of the frames, of information on channels on which the faults have occurred. Upon receipt of the channel information from RPR device 91, RPR device 90 narrows down the bandwidth of radio transmission paths 95 of normal channels, and continues the transmission of frames.

When the occurrence of faults is detected on more than one-half (five channels) of all channels, RPR device 91 notifies RPR device 90 of non-permission information which indicates that communications are not permitted. Upon receipt of the non-permission information from RPR device 91, RPR device 90 transmits frames to RPR device 94 in a direction opposite to RPR device 91. This processing is called wrapping processing which is one of the protection functions defined by RPR.

In the data transmission system described above, faults can occur in a plurality of sections. For example, faults can occur in a section between RPR device 90 and RPR device 91, and in a section between RPR device 93 and RPR device 94. In such an event, if faults occur on a number of channels which exceed one-half of all channels in each section, protection processing (wrapping processing) is performed in each section to break the network into a plurality of fragments. In this event, the broken network can result in an inability to transmit frames returned by the wrapping processing.

In the following, a specific description will be given with reference to FIG. 2.

Here, a description will be given of exemplary operations when RPR device 93 transmits frames to RPR device 91 in the event that faults occur in section A between RPR device 90 and RPR device 91 and in section B between RPR device 92 and RPR device 93 in FIG. 2.

In a normal operation, RPR device 93 transmits frames to RPR device 91 through RPR device 90. When faults occur on a number of channels exceeding one-half of all channels in section A, protection processing (wrapping processing) is performed. As a result, RPR device 90 returns the frames from RPR device 93 back to RPR device 93. Then, RPR device 93 transmits the frames from RPR device 90 to RPR device 91 through RPR device 92. In a scenario where such an operation is performed to forward the frames, if faults occur in section B on a number of channels exceeding one-half of all channels, triggering protection processing (wrapping processing), RPR device 93 again returns the frames from RPR device 90 back to RPR device 90. As a result, the frames cannot be transmitted from RPR device 93 to RPR device 91.

SUMMARY OF THE INVENTION

It is an object of the present invention to provide a data transmission system, a transmitter, and a data transmission control method, which are capable of solving the problem mentioned above.

To achieve the above object, a data transmission system of the present invention is a data transmission system having a plurality of transmitters connected in a ring configuration, wherein each of the plurality of transmitters comprises:

a band monitoring unit for monitoring bandwidths of a first and a second transmission path between one of the transmitters that comprise the ring and a first and a second transmitter on both sides of said transmitter, respectively; and a protection execution unit for executing protection processing by setting up a bypass path for each of the first and second transmission paths, wherein the protection execution unit confirms whether or not protection processing is being executed by one of the transmitters that comprise the ring and the other transmitters when the bandwidth of the first or second transmission path acquired by the band monitoring unit decreases below a threshold, and executes the protection for the first or second transmission path which is determined to have a bandwidth smaller than the threshold only when any one of the transmitters and the other transmitters is not executing protection processing.

Also, a transmitter of the present invention is a transmitter for making up a transmission path in a ring configuration together with a plurality of other transmitters. The transmitter comprises:

a band monitoring unit for monitoring bandwidths of a first and a second transmission path between one of the transmitters that comprise the ring and a first and a second transmitter on both sides of said transmitter, respectively; and a protection execution unit for executing protection processing by setting up a bypass path for each of the first and second transmission paths, wherein the protection execution unit confirms whether or not the protection is being executed by one of the transmitters comprising the ring and the plurality of other transmitters when the bandwidth of the first or second transmission path acquired by the band monitoring unit decreases below a threshold, and executes protection processing for the first or second transmission path which is determined to have a bandwidth smaller than the threshold only when any one of the transmitters and the plurality of other transmitters is not executing protection processing.

Also, a protection control method of the present invention is a method of controlling protection processing in a transmitter for making up a transmission path in a ring configuration together with a plurality of other transmitters. The method comprises:

a bandwidth monitoring step for monitoring bandwidths of a first and a second transmission path between one of the transmitters that comprise the ring and a first and a second transmitter on both sides of said transmitter, respectively; and a protection execution step for executing protection processing by setting up a bypass path for each of the first and second transmission paths, wherein the protection execution step includes the step of confirming whether or not protection processing is being executed for each of the first and second transmission paths by the transmitter that comprises the ring and the plurality of other transmitters when the acquired bandwidth of the transmission path decreases below a threshold on the transmission path, and executing protection processing for the transmission path only when any one of the transmitters and the plurality of other transmitters is not executing protection processing.

According to the present invention, when the bandwidth of the transmission path decreases, no protection is executed for this transmission path, whose bandwidth is reduced, if the protection is being executed for another transmission path, so that the network can be restrained from being broken into a plurality of fragments. In this way, data can be correctly transmitted.

DESCRIPTION OF THE PREFERRED EMBODIMENTS

First Embodiment

Figure 1:
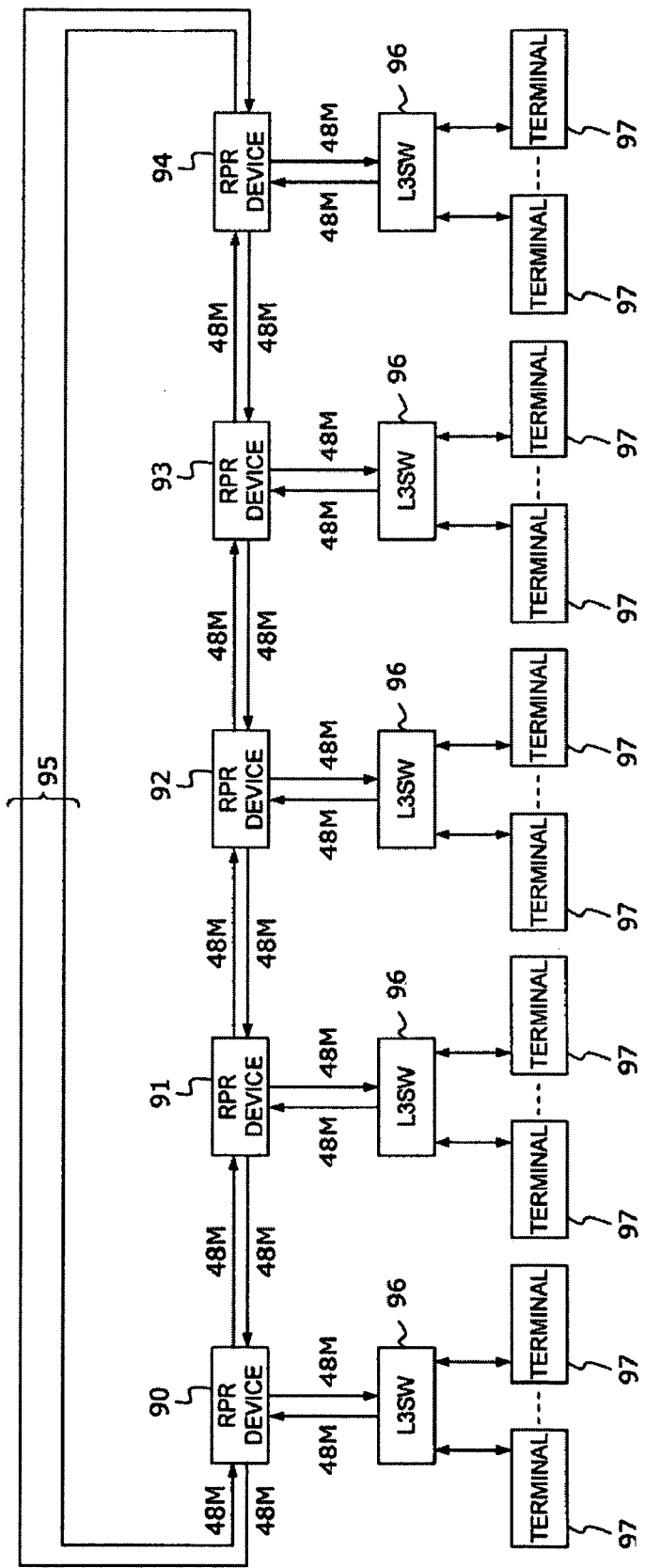
FIG. 1 is a block diagram showing the configuration of a data transmission system disclosed in JP-2006-80888A.
Figure 2:
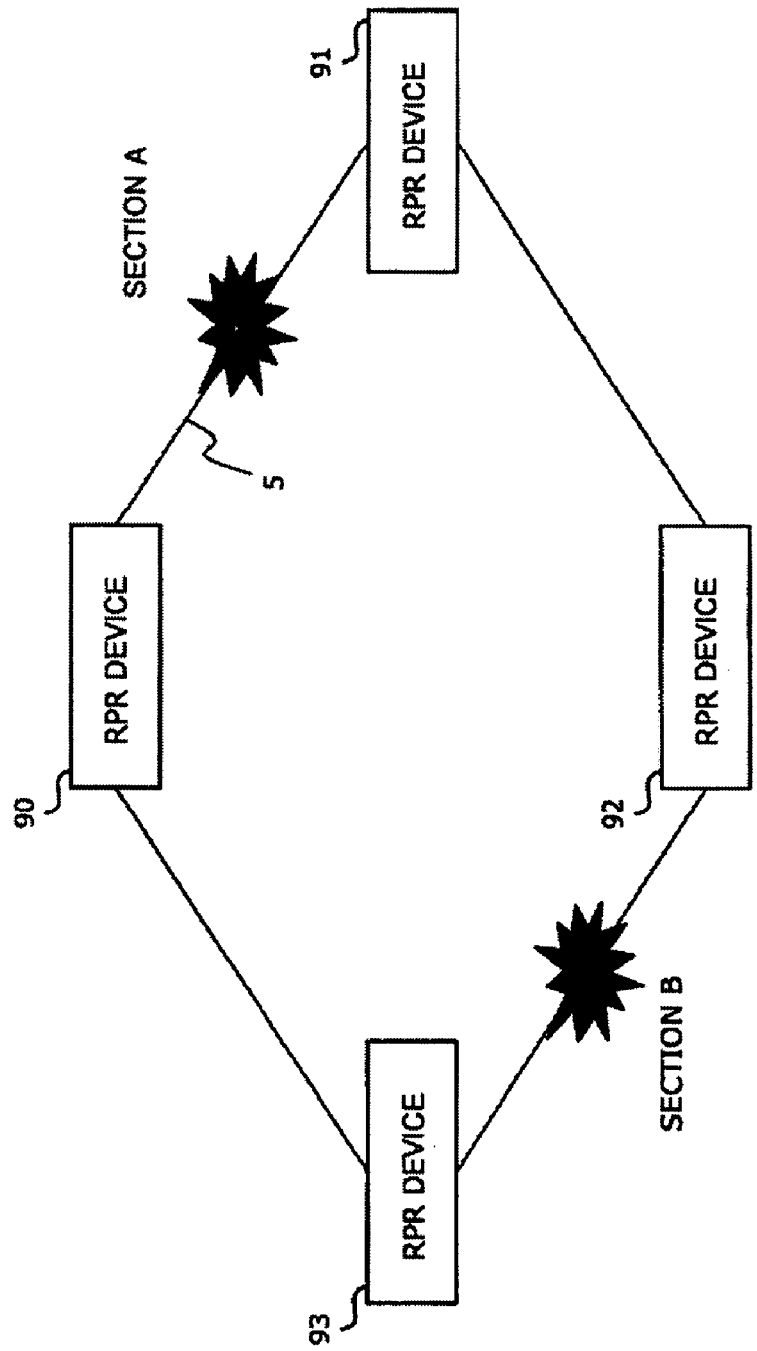
FIG. 2 is a block diagram showing the configuration of a data transmission system for describing a problem of JP-2006-80888A.
Figure 3:
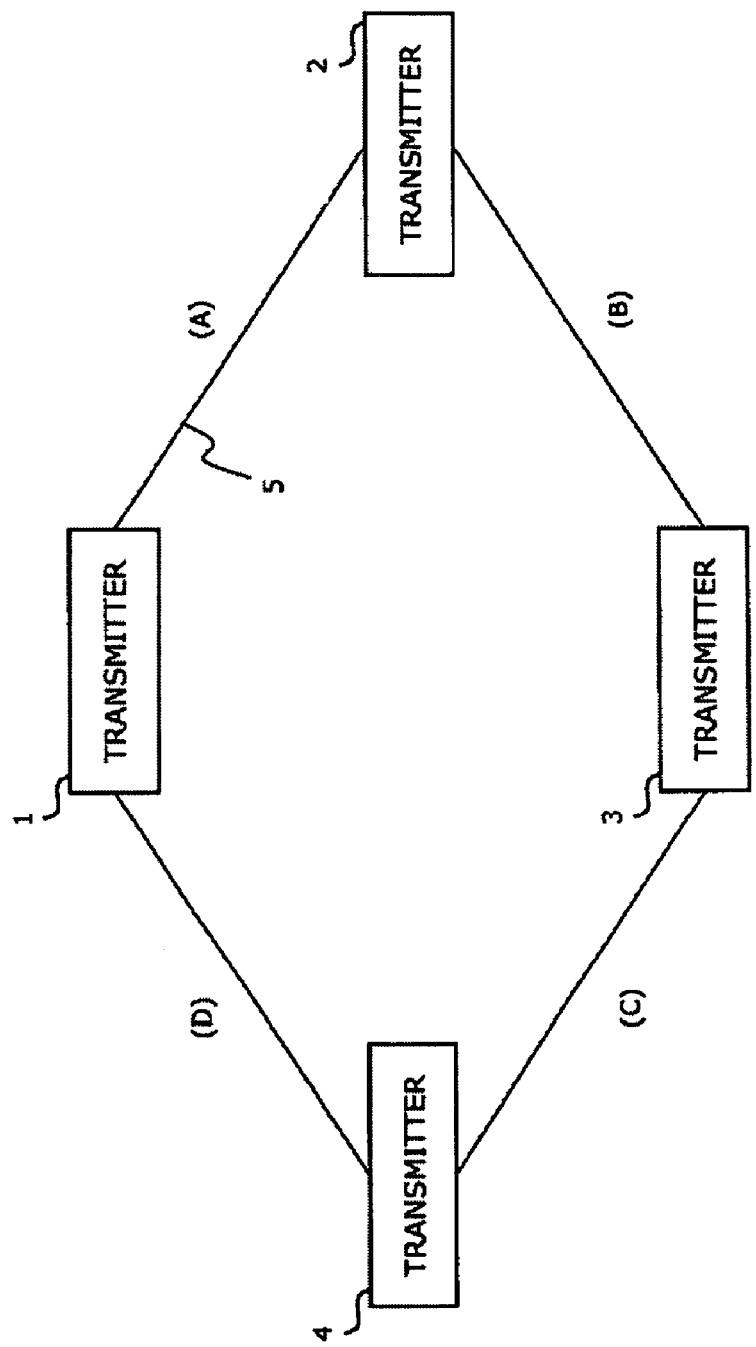
FIG. 3 is a block diagram showing the configuration of a data transmission system in a first embodiment.

Referring to FIG. 3 there is shown an embodiment of a data transmission system which has transmitters 1, 2, 3, 4.

As shown in FIG. 3, transmitters 1, 2, 3, 4 are connected in a ring configuration through full-duplex transmission path 5. Also, transmitters 1, 2, 3, 4 are connected to a plurality of communication terminals (not shown) through an external network.

Each of transmitters 1, 2, 3, 4 monitors transmission path 5 adjacent thereto for a bandwidth. When the bandwidth of transmission path 5 decreases below a threshold, each of transmitters 1, 2, 3, 4 checks whether or not RPR protection is being executed by a proper transmitter (any one of the transmitters) or the other transmitters. When RPR protection is being executed, each of transmitters 1, 2, 3, 4 continues a data transmission over a path through transmission path 5 which has a reduced bandwidth, whereas when RPR protection is not being executed, the proper transmitter starts execution of RPR protection.

In the following, the configuration of transmitter 1 will be described in detail.

Figure 4:
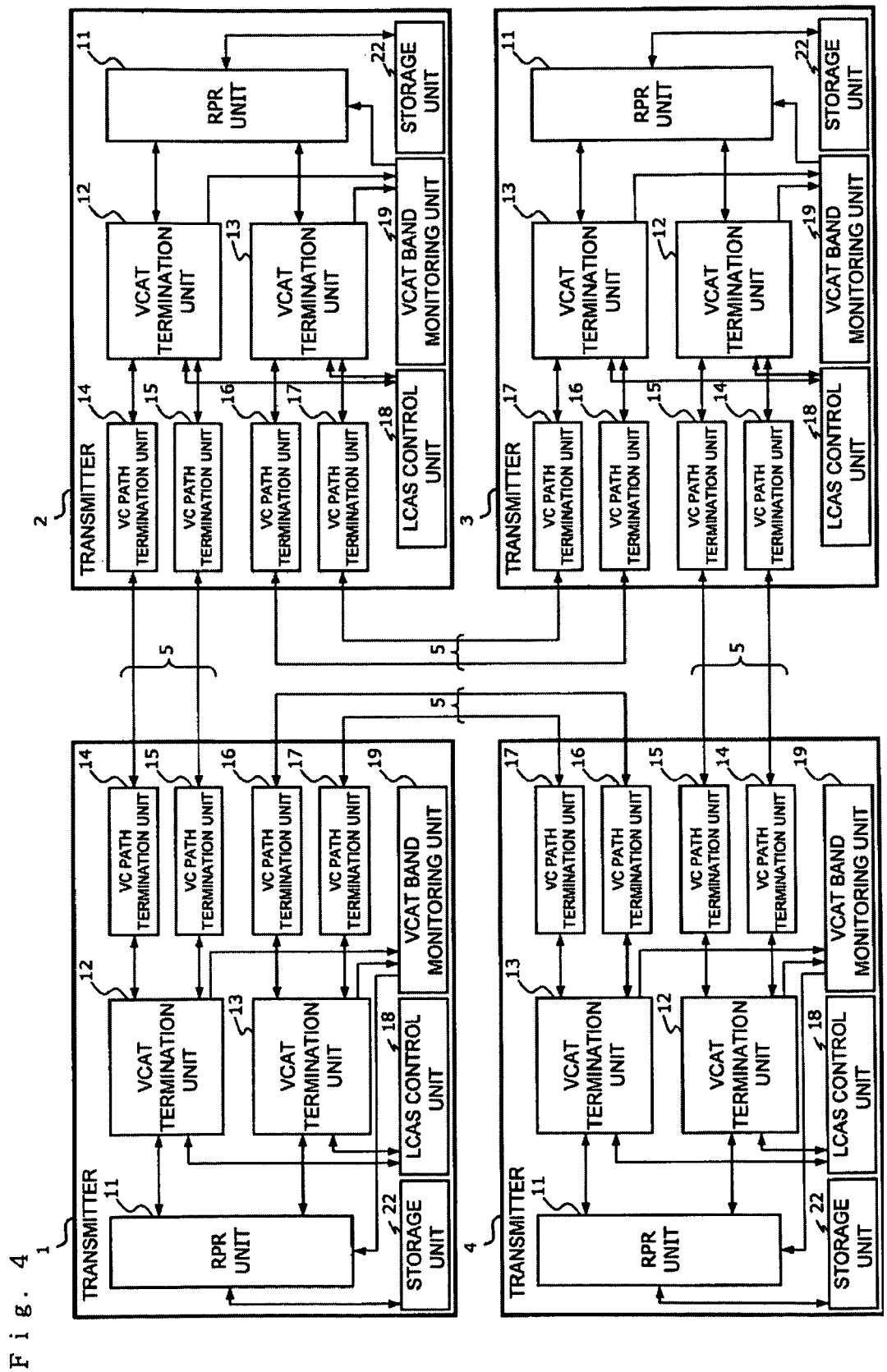
FIG. 4 is a block diagram showing the configuration of a transmitter in the first embodiment.

Referring to FIG. 4, there is shown the configuration of transmitter 1 in a first embodiment of the present invention. While the configuration of transmitter 1 is herein described, transmitter 2, transmitter 3, and transmitter 4 are also similar in configuration to transmitter 1.

Transmitter 1 comprises RPR unit 11, VCAT (Virtual Concatenation) termination units 12, 13, VC path termination units 14, 15, 16, 17, LCAS (Link Capacity Adjustment Scheme) control unit 18, VCAT bandwidth monitoring unit 19, and storage unit 22.

RPR unit 11 is connected to each of VCAT termination units 12, 13 and also to storage unit 22.

VCAT termination unit 12 is connected to each of VC path termination units 14, 15. VC path termination unit 14 is connected to VC path termination unit 14 of transmitter 2. VC path termination unit 15 in turn is connected to VC path termination unit 15 of transmitter 2.

VCAT termination unit 13 is connected to each of VC path termination units 16, 17. VC path termination unit 16 is connected to VC path termination unit 16 of transmitter 3. VC path termination unit 17 in turn is connected to VC path termination unit 17 of transmitter 3.

Storage unit 22 stores a threshold value. The threshold value is used for determining whether or not the RPR protection should be executed. The threshold value is set as appropriate based on the bandwidth of the VCAT path termination unit.

Storage unit 22 also stores section information and a flag in association with each other.

The section information is information for identifying a section between adjacent transmitters. Section information A is information for identifying a section between transmitter 1 and transmitter 2. Section information B is information for identifying a section between transmitter 2 and transmitter 3. Section information C is information for identifying a section between transmitter 3 and transmitter 4. Section information D is information for identifying a section between transmitter 4 and transmitter 1.

The flag indicates whether or not each transmitter 1-4 is executing RPR protection. Each of transmitters 1-4 can determine whether or not another transmitter is executing RPR protection by referring to the flag stored in the proper transmitter. Each transmitter 1-4 updates the flag stored therein by mutually transmitting/receiving information indicative of whether or not RPR protection is being executed. Specifically, each transmitter 1-4 mutually transmits/receives a protection setting signal indicating that RPR protection has been set (including section information for identifying a section subjected to the execution of RPR protection), and a protection release signal indicating that RPR protection has been released (including section information for identifying a section subjected to the execution of RPR protection), thereby updating the flag within the transmitters. When RPR protection is executed in any of transmitters 1-4, the flag is set for identification information of a section which is subjected to the execution of RPR protection. The flag set for the identification information of the section that is subjected to RPR protection is removed when the RPR protection is released.

VC path termination units 14-17 are path termination units of VC paths, and transmit/receive frames to/from the VC path termination units of other transmitters using the VC paths. Upon receipt of an RPR frame from VC path termination unit 14 of transmitter 2, VC path termination unit 14 transmits the received RPR frame to VCAT termination unit 12. Upon receipt of an RPR frame from VCAT termination unit 12, VC path termination unit 14 transmits the received RPR frame to VC path termination unit 14 of transmitter 2.

Also, each of VC path termination units 14-17 determines whether or not a fault occurs on a VC path associated therewith. For example, in a data transmission system, a monitoring frame circles the ring, and when VC path termination unit 14 cannot receives this monitoring frame even after the lapse of a predetermined period of time, VC path termination unit 14 determines that a fault has occurred on the VC path. This fault on the VC path may be, for example, a break of a communication line (optical fiber or the like) which connects between the VC path termination units.

VC path termination unit 14 transmits a VC path fault occurrence signal indicative of the occurrence of a fault to VCAT termination unit 12 upon detection of a fault on a VC path. The VC path fault occurrence signal includes VC path identification information for identifying a VC path on which a fault has occurred.

Also, upon detection of recovery of a VC path from a fault, VC path termination unit 14 transmits a VC path fault recovery signal indicative of the recovery from the fault to VCAT termination unit 12. The VC path fault recovery signal includes VC path identification information for identifying a VC path on which a fault has occurred.

Whereas the foregoing description has been given of the configuration of VC path termination unit 14, VC path termination units 15, 16, 17 are also similar in configuration.

VCAT termination units 12, 13 are path termination units of VCAT paths. Upon receipt of an RPR frame from VC path termination unit 14, 15, VCAT termination unit 12 transmits the received RPR frame to RPR unit 11. Also, upon receipt of an RPR frame from RPR unit 11, VCAT termination unit 12 transmits the received RPR frame to VC path termination unit 14 or VC path termination unit 15.

The VCAT paths of VCAT termination unit 12 comprises two VC paths, i.e., a VC path of VC path termination unit 14 and a VC path of VC path termination unit 15. These two VC paths are called "members of VCAT path."

Upon receipt of a VC path fault occurrence signal from VC path termination unit 14, VCAT termination unit 12 supplies the received VC path fault occurrence signal to LCAS control unit 18, and supplies a fault occurrence signal indicative of a reduction in the bandwidth of the VCAT path to VCAT bandwidth monitoring unit 19. The fault occurrence signal includes section information (in this event, section information A) for identifying a VCAT path whose bandwidth has been reduced.

Upon receipt of a VC path fault recovery signal from VC path termination unit 14, VCAT termination unit 12 transmits the received VC path fault recovery signal to LCAS control unit 18, and supplies a fault recovery signal indicative of an increase in the bandwidth of VCAT path to VCAT bandwidth monitoring unit 19. The fault recovery signal includes section information (in this event, section information A) for identifying a VCAT path whose bandwidth has been increased.

While the foregoing description has been given of the configuration of VCAT termination unit 12, VCAT termination unit 13 is also similar in configuration.

LCAS control unit 18 performs processing for registration of VC paths in each VC path termination unit 14-17 in the members of VCAT path, and deletion of the VC paths from the members of the VCAT path. Assume, for example, that a VC path fault occurrence signal includes identification information on a VC path of to VC path termination unit 14. Upon receipt of a VC path fault occurrence signal from VCAT termination unit 12, LCAS control unit 18 deletes a VC path of VC path termination unit 14 from the members of the VCAT path of VCAT termination unit 12 based on the VC path identification information included in the received fault occurrence signal. The bandwidth of VCAT termination unit 12 is reduced as a result of the deletion of the VC path of VC path termination unit 14 from the members of VCAT path of VCAT termination unit 12.

Upon receipt of a VC path fault recovery signal including identification information on a VC path of VC path termination unit 14 from VCAT termination unit 12, LCAS control unit 18 registers the VC path of VC path termination unit 14 in the members of the VCAT path of VCAT termination unit 12 based on the received VC path fault recovery signal. The bandwidth of VCAT termination unit 12 is increased by registering the VC path of VC path termination unit 14 in the members of the VCAT path of VCAT termination unit 12.

While the foregoing description has been made in connection with the processing of LCAS control unit 18 to delete the VC path of VC path termination unit 14 from the members of the VCAT or to register the VC path in the members of VCAT, similar processing is performed for other VC path termination units 15, 16, 17 as well.

VCAT bandwidth monitoring unit 19 monitors the bandwidth of VCAT termination units 12, 13 based on a fault occurrence signal and a fault recovery signal from VCAT termination units 12, 13. When the bandwidth is reduced or increased for any of VCAT termination units 12, 13, VCAT bandwidth monitoring unit 19 transmits the reduced or increased bandwidth to RPR unit 11 as bandwidth information. The bandwidth information includes section information indicative of a section in which the bandwidth was reduced or increased. This section information can be acquired from the fault occurrence signal or fault recovery signal. For example, when the bandwidth of VCAT termination unit 12 is reduced, VCAT bandwidth monitoring unit 19 transmits bandwidth information including the bandwidth after the decrease and section information A to RPR unit 11. In this regard, the bandwidth information may be PLCR (Partial Loss of Capacity Receiver) or PLCT (Partial Loss of Capacity Transmit) defined in G.806.

Upon receipt of a MAC frame destined from an external communication terminal (for example, an originating client terminal) to another communication terminal (for example, a destination client terminal), RPR unit 11, which is a protection execution unit, generates an RPR frame by adding header information of RPR to the received MAC frame. Then, RPR unit 11 transmits the generated RPR frame to VCAT termination unit 12.

This MAC frame includes header information, data, and FCS (Frame Check Sequence). The header information is comprised of information such as a MAC address of a destination communication terminal, a MAC address of an originating communication terminal, and the like. Header information for RPR and the MAC frame are added to the RPR frame. The header information for RPR includes an MAC address of a transmitter, a ring identifier and the like. The ring identifier is used to specify a right-handed transmission path or a left-handed transmission path. The ring identifier is "0" for a right-handed transmission path. The ring identifier is "1" for a left-handed transmission path. Whether a transmission path is right-handed or left-handed is determined by the number of transmitters installed between the proper transmitter and a target transmitter. A transmission path to be specified includes a smaller number of transmitters.

Upon receipt of an RPR frame from VCAT termination unit 12, RPR unit 11 compares the MAC address of the associated transmitter with the MAC address of a transmitter described in the header information of the received RPR frame. If they match as a result of the comparison, RPR unit 11 extracts a MAC frame from the received RPR frame, and sends the extracted MAC frame to an external network. If they do not match as a result of the comparison, RPR unit 11 returns the RPR frame to VCAT termination unit 12.

RPR unit 11 also sets or releases the RPR protection. Upon receipt of bandwidth information from VCAT bandwidth monitoring unit 19, RPR unit 11 compares the bandwidth included in the received bandwidth information with a threshold stored in storage unit 22. As a result of the comparison, RPR unit 11 references a flag stored in storage unit 22 when the received bandwidth is less than the threshold.

As a result of the reference, when the flag is not set, RPR unit 11 sets the RPR protection for a concerned section information based on section information included in the received bandwidth information. Then, RPR unit 11 sets a flag for section information in which the RPR protection has been set, and transmits a protection setting signal to another transmitter. A transmitter which has received the protection setting signal sets a flag for an concerned section information based on the section information included in the received protection setting signal.

As a result of the comparison, when the flag is set, RPR unit 11 waits for setting RPR protection in because the RPR protection has been set in other section information. RPR unit 11 executes the RPR protection which has remained in a waiting state after the set RPR protection was released in the other section information.

In this regard, when a plurality of transmitters fall into the RPR protection waiting state, the RPR protection may be executed in the order in which the transmitters come into the waiting state. For example, the respective transmitters mutually share a time at which the RPR protection falls into a waiting state. As the set RPR protection is released in other section information, the transmitters reference the times at which they come into the waiting state. The transmitter which comes into the waiting state least recently sets the RPR protection the next time. Alternatively, RPR protection may be executed orderly from a transmitter which has the largest difference between the reduced bandwidth and the threshold.

After executing RPR protection, when the bandwidth included in the bandwidth information received from VCAT bandwidth monitoring unit 19 is equal to or larger than the threshold, RPR unit 11 releases the set RPR protection. Then, RPR unit 11 removes the flag which has been set when the RPR protection was executed, and transmits a protection release signal to other transmitters. The transmitters which have received the protection release signal remove the flag set in the concerned section information based on the section information included in the received protection release signal.

While the foregoing description has shown exemplary operations of transmitter 1 for setting RPR protection, similar operations are performed by transmitters 2, 3, 4. as well.

The operations of transmitters 1, 2, 3, 4 are implemented by installing a variety of functions called a VCAT function, an LCAS function, and an RPR protection function into transmitters 1, 2, 3, 4.

In the following, a variety of these functions will be described in detail.

First, the VCAT function will be described. The VCAT function is defined in G.707 recommended by ITU-T (International Telecommunication Union Telecommunication Standardization Sector), and is a function of virtually coupling a plurality of VC paths within SDH/SONET for use as a single VC path. The VCAT function can provide a band comprised of a plurality of bundled VC (Virtual COntainer) paths such as OC-3 (15 Mbps), VC-4 (149.76 Mbps) or the like.

Next, the LCAS function will be described. The LCAS function is defined in G.7042 recommended by ITU-T, and is a function of dynamically increasing/decreasing a band provided by the VCAT function by adding a VC path or deleting a VC path.

Finally, the RPR protection function will be described. The RPR protection function is a function of establishing a transmission path which circumvents a fault within 50 milliseconds if a transmission path fails.

This RPR protection function is classified into a steering function and a wrapping function. With the steering function, a transmitter itself which transmits an RPR frame previously switches the direction in which the RPR frame is sent while avoiding a failed transmission path. With the wrapping function, a transmitter connected to a failed transmission path returns an RPR frame to an originating transmitter.

Figure 5A:
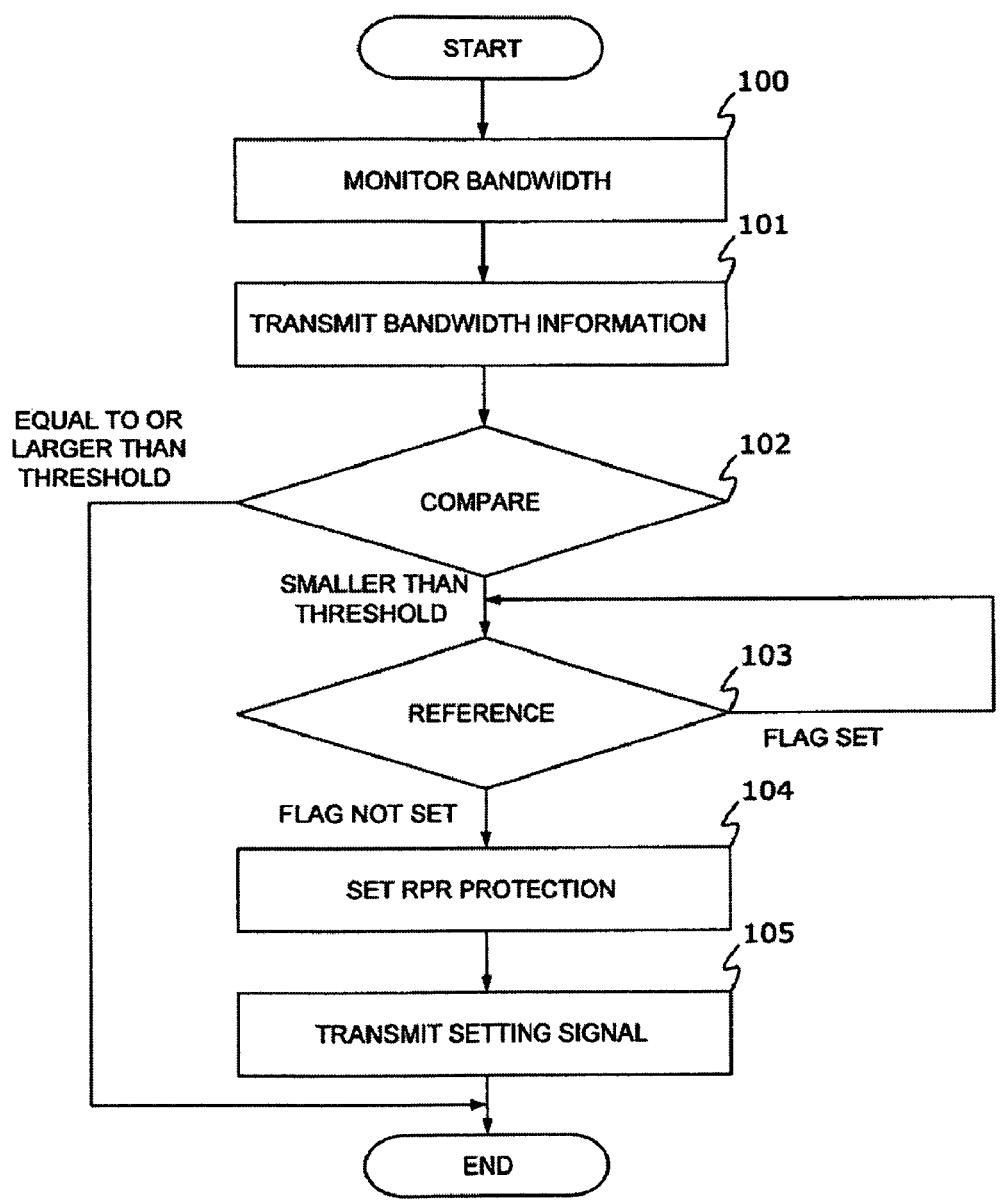
FIG. 5A is a flow chart for describing the operation of the transmitter when a fault occurs on a VC path of a VC path termination unit.

The operation of transmitter 1 (RPR protection execution procedure) will be described with reference to FIG. 5A when a fault occurs on a VC path of VC path termination unit 14.

VCAT band monitoring unit 19 monitors the bandwidth of VCAT termination unit 12 based on a fault occurrence signal from VCAT termination unit 12 at step 100. Upon receipt of the fault occurrence signal from VCAT termination unit 12, VCAT band monitoring unit 19 transmits a reduced bandwidth to RPR unit 11 as bandwidth information at step 101.

Upon receipt of the bandwidth information from VCAT band monitoring unit 19, RPR unit 11 compares the bandwidth included in the bandwidth information with a threshold stored in storage unit 22 at step 102. The processing is terminated when the bandwidth is equal to or larger than the threshold.

When the bandwidth is smaller than the threshold, RPR unit 11 references a flag stored in storage unit 22 at step 103. As a result of the reference, when the flag is set, the procedure returns to step 103.

When the flag is not set, RPR unit 11 executes an RPR protection for concerned section information based on the section information included in the received bandwidth information at step 104. Then, RPR unit 11 sets a flag for the section information for which RPR protection has been executed, and transmits a protection setting signal to other transmitters at step 105.

Figure 5B:
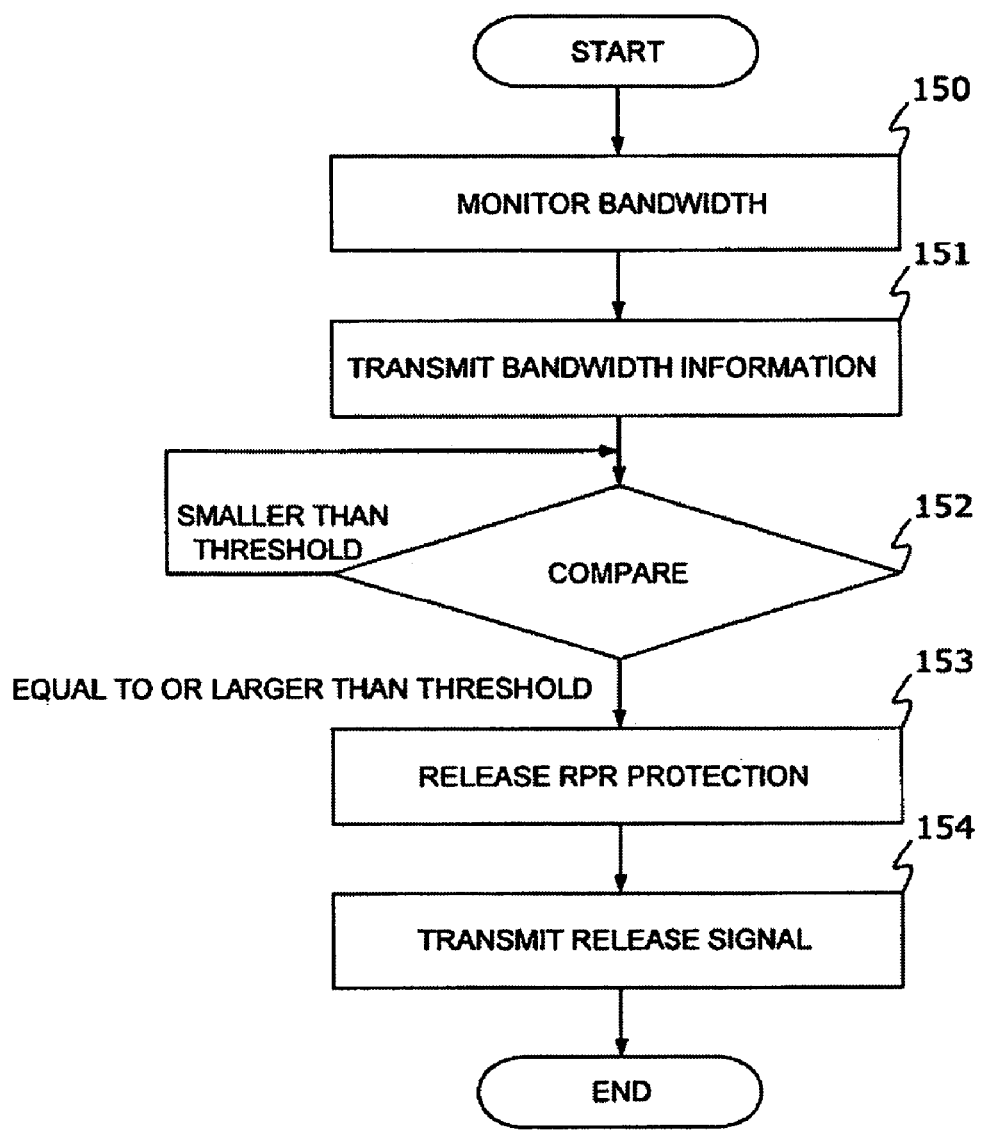
FIG. 5B is a flow chart for describing the operation of the transmitter when the VC path of the VC path termination unit has recovered from a fault.

The operation of transmitter 1 (RPR protection release procedure) will be described with reference to FIG. 5B when a VC path of VC path termination unit 14 recovers from a fault after the execution of the RPR protection.

VCAT band monitoring unit 19 monitors the bandwidth of VCAT termination unit 12 based on a fault recovery signal from VCAT termination unit 12 at step 150. Upon receipt of the fault recovery signal from VCAT termination unit 12, VCAT band monitoring unit 19 transmits an increased bandwidth to RPR unit 11 as bandwidth information at step 151.

Upon receipt of the bandwidth information from VCAT band monitoring unit 19, RPR unit 11 compares the bandwidth included in the received bandwidth information with a band threshold at step 152. The processing is terminated when the bandwidth is smaller than the band threshold. When the bandwidth is equal to or larger than the band threshold, RPR unit 11 releases an RPR protection set for pertinent section information based on section information included in the received bandwidth information at step 153. Then, at step 154, RPR unit 11 removes the flag for the section information from which the set RPR protection has been released, and transmits a protection release signal to other transmitters.

As described above, according to this embodiment, when a bandwidth is reduced in certain section information, the RPR protection (wrapping processing or the like) is not executed, unlike JP-2006-80888A, for the section information associated with the reduced bandwidth, if the RPR protection has been set in other section information. In this way, the network can be restrained from being broken into a plurality of fragments.

For example, in the data transmission system disclosed in JP-2006-80888A, if protection processing (wrapping processing) is performed in each of two failed sections identified by section information A, C, frames cannot be transmitted from transmitter 4 to transmitter 2. In this embodiment, on the other hand, even if protection processing is to be performed in a section identified by section information C, this protection processing is given up when protection processing has been already executed in a section identified by section information A. In this way, the network can be restrained from being broken into a plurality of fragments. As a result, frames are normally transmitted from transmitter 4 to transmitter 2 through a section identified by section information C.

In the embodiment described above, the threshold is set based on the bandwidth of the VC path termination unit from the viewpoint of restraining a ring-shaped transmission path (network) from being broken into a plurality of fragments. However, taking into consideration the execution of a fairness function, which is one of RPR functions, the threshold is preferably set within a range of the bandwidth in which the fairness function normally works. The fairness function is a function for fairly transmitting frames between transmitters using a fairness algorithm. In this event, a range of bandwidth available for setting is determined in the following manner.

Assuming, for example, that an entire transmission path has a bandwidth of 1500 Mbps (ten VC paths of 150 Mbps), each transmitter 1-4 has a bandwidth of 375 Mbps (=1500 Mbps/4) which is set upon execution of the fairness function. In this event, the fairness function will correctly work if the threshold is set to a bandwidth of 375 Mbps (three or more VC paths of 150 Mbps) or larger. Also, in the foregoing assumed scenario, the threshold must be set to a value smaller than 1350 Mbps (=1500 Mbps−150 Mbps) in order to sense that a fault has occurred on at least one VC path. From such considerations, the threshold can be set within a bandwidth range that is equal to or larger than 375 Mbps and that is smaller than 1350 Mbps.

In this regard, assume that the threshold is set to 375 Mbps. Even if the bandwidth of VC path termination unit 14 is reduced below this threshold (for example, 300 Mbps), the transmitter itself cannot execute the RPR protection if other transmitter is executing the RPR protection. In this event, the transmitter will operate with a bandwidth that is narrower than the bandwidth (375 Mbps) which is required to execute the fairness function, as described above. Accordingly, the threshold is preferably set within an available bandwidth having a lower limit that has a bandwidth margin that is at least one VC path with respect to a bandwidth which is set when the fairness function is executed.

While this embodiment has shown an example in which four transmitters are used in a data transmission system, the present invention is not so limited. For example, three or more transmitters may be included in a data transmission system.

Second Embodiment

A second embodiment differs from the first embodiment in that the traffic amount received from other transmitter is compared with the bandwidth of a VCAT path when RPR protection is set.

Figure 6:
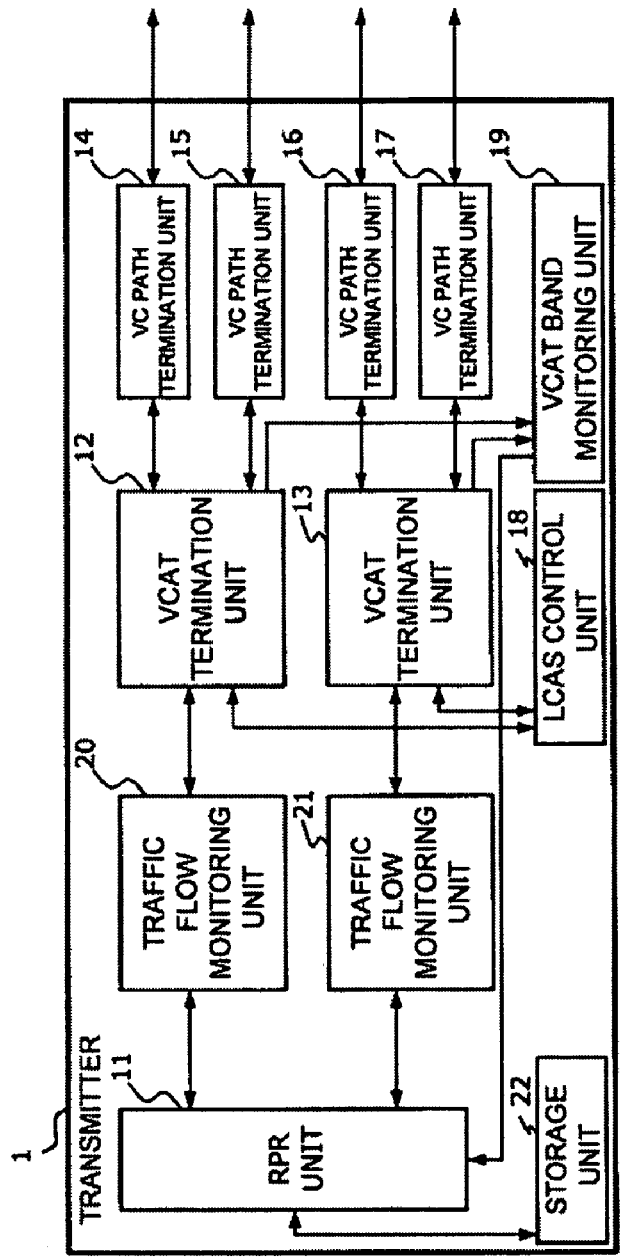
FIG. 6 is a block diagram showing the configuration of a transmitter in a second embodiment.

Referring to FIG. 6, there is shown the configuration of a transmitter in the second embodiment of the present invention. While the configuration of transmitter 1 will be described in detail, transmitters 2, 3, 4 are similar in configuration to transmitter 1.

Transmitter 1 comprises RPR unit 11, VCAT termination units 12, 13, VC path termination units 14, 15, 16, 17, LCAS control unit 18, VCAT band monitoring unit 19, traffic flow monitoring units 20, 21, and storage unit 22. Some functions of RPR unit 11 and VCAT termination units 12, 13, as well as traffic flow monitoring units 20, 21, differ from those of the first embodiment. The following description will be centered on functions and operations of components which differ from those of the first embodiment.

Traffic flow monitoring unit 20 is connected to VCAT termination unit 12, while traffic flow monitoring unit 21 is connected VCAT termination unit 13.

Upon receipt of a VC path fault recovery signal from VC path termination unit 14, VCAT termination unit 12 transmits the received VC path fault recovery signal to LCAS control unit 18. Also, when VCAT termination unit 12 senses the recovery of faults on all VC paths, VCAT termination unit 12 supplies VCAT band monitoring unit 19 with a fault recovery sensing signal which indicates that all VC paths have recovered from faults. The fault recovery sensing signal includes section information (in this event, section information A) for identifying a VCAT path which has recovered from a VC path fault.

Here, a description will be given of exemplary operations of VCAT termination unit 12 for sensing the recovery of all VC paths from faults. VCAT termination unit 12 holds the number of failed VC path termination units (hereinafter called the "fault occurrence count"). The fault occurrence count is "0" when both VC path termination units 14, 15 are normal. When VC termination unit 14 fails, VCAT termination unit 12 updates the fault occurrence count from "0" to "1" when it receives a VC path fault occurrence signal from VC path termination unit 14. Subsequently, VCAT termination unit 12 updates the fault occurrence count from "1" to "0" when it receives a VC path fault recovery signal from VC path termination unit 14. In this way, VCAT termination unit 12 transmits a fault recovery sensing signal to VCAT band monitoring unit 19 when it updates the fault occurrence number to "0."

While the foregoing description has shown the configuration of VCAT termination unit 12, VCAT termination unit 13 is also similar in configuration.

Traffic flow monitoring unit 20 measures the amount of traffic which flows through VCAT termination units 12, 13. Specifically, traffic flow monitoring unit 20 measures, at regular time intervals, the amount of traffic which flows through VCAT termination unit 12. Traffic flow monitoring unit 20 transmits the measured traffic amount to RPR unit 11 as traffic amount information. This traffic amount information includes information (section information A) on a transmission path which connects transmitters 1, 2. Similar to this, traffic flow monitoring unit 21 measures the amount of traffic which flows through VCAT termination unit 13 at regular time intervals. Traffic flow monitoring unit 21 transmits the measured traffic amount to RPR unit 11 as traffic amount information. This traffic amount information includes information (section information D) of a transmission path which connects transmission paths 1, 4.

While the foregoing description has shown the configuration of traffic flow monitoring unit 20, traffic flow monitoring unit 21 is also similar in configuration.

Upon receipt of the traffic amount information from traffic flow monitoring units 20, 21, RPR unit 11 stores the received traffic amount information in storage unit 22. In this regard, storage unit 22 may store the most recent traffic amount information.

Upon receipt of bandwidth information from VCAT band monitoring unit 19, RPR unit 11 compares a bandwidth included in the received bandwidth information with the most recent traffic amount information; stored in storage unit 22, at the time the bandwidth information is received.

When the bandwidth is smaller than the traffic amount, RPR unit 11 references a flag stored in storage unit 22.

As a result of the reference, when the flag is not set, RPR unit 11 sets RPR protection in concerned section information based on section information included in the traffic amount information. Then, RPR unit 11 sets a flag for the section information for which RPR protection has been set, and transmits a protection setting signal indicative of the set RPR protection to other transmitters.

As a result of the reference, when the flag is set, RPR unit 1 comes into a RPR protection setting waiting state because RPR protection has been set in other section. When RPR protection set in other section is released, RPR unit 11 starts the execution of RPR protection which has been brought into the waiting state.

Figure 7A:
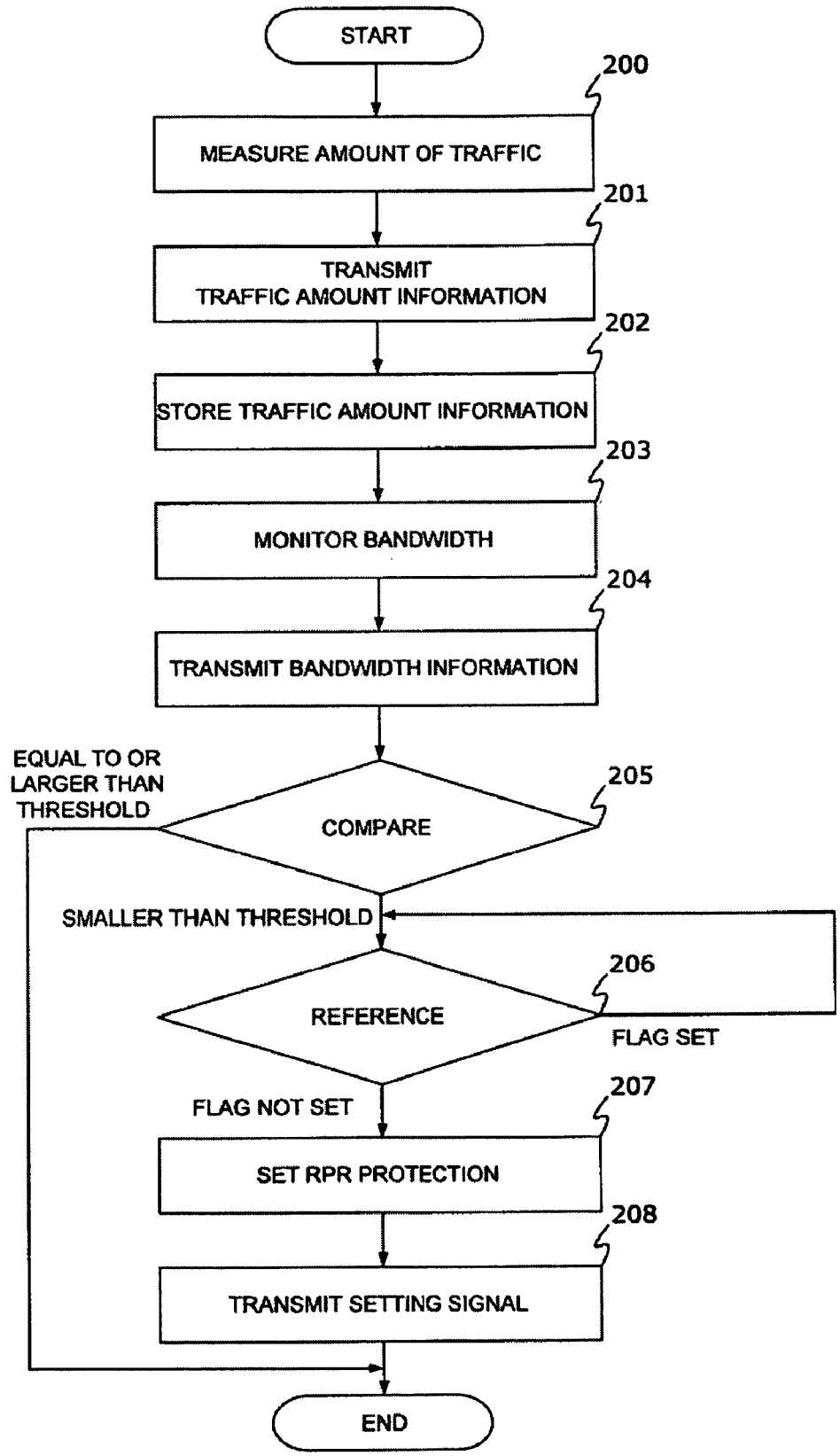
FIG. 7A is a flow chart for describing the operation of the transmitter when a fault occurs on a VC path of a VC path termination unit.

The operation of transmitter 1 (RPR protection execution procedure) will be described with reference to FIG. 7A when a fault occurs on a VC path of VC path termination unit 14.

Traffic flow monitoring unit 20 measures the amount of traffic flowing through VCAT termination unit 12 at step 200. Traffic flow monitoring unit 20 transmits the measured traffic amount to RPR unit 11 as traffic amount information at step 201.

Upon receipt of the traffic amount information from traffic flow monitoring unit 20, RPR unit 11 stores the received traffic amount information in storage unit 22 at step 202.

VCAT band monitoring unit 19 monitors the bandwidth of VCAT termination unit 12 based on a fault occurrence signal from VCAT termination unit 12 at step 203. Upon receipt of the fault occurrence signal from VCAT termination unit 12, VCAT band monitoring unit 19 transmits a reduced bandwidth to RPR unit 11 as bandwidth information at step 204.

RPR unit 11 compares the reduced bandwidth included in the bandwidth information received from VCAT band monitoring unit 19 with the traffic amount information stored in storage unit 22 at step 205. As a result of the comparison, when the reduced bandwidth is equal to or larger than the traffic amount, the processing is terminated. In this way, the transmission of frames is continued.

When the reduced bandwidth is smaller than the traffic amount, RPR unit 11 references a flag stored in storage unit 22 at step 206. As a result, when the flag is set, the processing returns to step 206.

As a result, when the flag is not set, RPR unit 11 executes RPR protection for section information included in the received traffic information at step 207. Then, at step 208, RPR unit 11 sets a flag for the section information for which RPR protection has been executed, and transmits a protection setting signal to other transmitters.

Figure 7B:
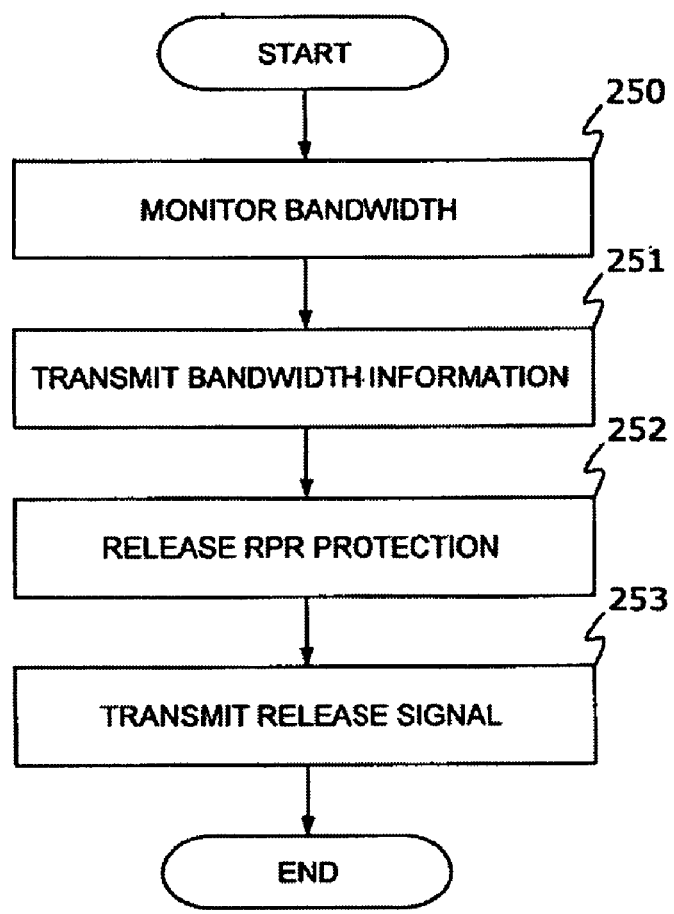
FIG. 7B is a flow chart for describing the operation of the transmitter when the VC path of the VC path termination unit has recovered from a fault.

The operation of transmitter 1 (RPR protection release procedure) will be described with reference to FIG. 7B when a VC path of VC path termination unit 14 recovers from a fault after the execution of RPR protection.

VCAT band monitoring unit 19 monitors the bandwidth of VCAT termination unit 12 based on a fault recovery sensing signal from VCAT termination unit 12 at step 250. Upon receipt of the fault recovery sensing signal from VCAT termination unit 12, VCAT band monitoring unit 19 transmits an increased bandwidth to RPR unit 11 as bandwidth information at step 251.

Upon receipt of the bandwidth information from VCAT band monitoring unit 19, RPR unit 11 releases a set RPR protection based on the received bandwidth information at step 252. Then, at step 253, RPR unit 11 removes a flag for the section information for which the set RPR protection has been released, and transmits a protection release signal to other transmitters.

Thus, according to this embodiment, RPR unit 11 continues the transmission of frames using a transmission path having a reduced bandwidth due to a fault on a VC path, without setting RPR protection, because no congestion occurs on the transmission path as long as the reduced bandwidth is equal to or larger than the amount of actually flowing traffic.

In the first embodiment, the threshold for use in determining whether or not RPR protection should be executed is a fixed value. When the threshold is a fixed value, RPR protection is executed even when the amount of actually flowing traffic is extremely smaller than the threshold. For example, assume in the configuration shown in FIG. 3 that the amount of traffic is 10 Mbps in a section indicated by section information A (hereinafter called "section A"), this section A has a bandwidth of 600 Mbps, and the threshold is set to 300 Mbps. When the bandwidth of section a is reduced from 600 Mbps to 200 Mbps due to a fault occurring on a VC path of section A, the reduced bandwidth (200 Mbps) is below the threshold (300 Mbps). In this event, RPR protection is executed for section A irrespective of the amount of traffic in section A unless RPR protection is being executed in other section. When the amount of traffic is 10 Mbps in section A, RPR protection is not required for section A because data can be transmitted through section A.

In the second embodiment, in turn, the threshold is dynamically changed based on the amount of traffic. Accordingly, RPR protection may not be executed even if the bandwidth is reduced, when a small amount of traffic is actually flowing. For example, under the conditions shown in the exemplary operations in the first embodiment, since threshold is 10 Mbps, the RPR protection is not executed for section a even if the bandwidth of section a is reduced from 600 Mbps to 200 Mbps. Consequently, data can be transmitted through section a.

It should be noted that the dynamic change of the threshold is preferably made within a range of bandwidth in which the fairness function normally works in consideration of the fairness function which should be executed even when the threshold is dynamically changed in accordance with the amount of traffic. The bandwidth range in which the fairness function normally works may be determined as described in the first embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A data transmission system having a plurality of transmitters connected in a ring configuration, wherein each of said plurality of transmitter comprises:
   a band monitoring unit for monitoring bandwidths of a first and a second transmission path between one of said plurality of transmitters and a first and a second transmitter on both sides of said one transmitter, respectively; and
   a protection execution unit for executing a protection processing by setting up a bypass path for each of said first and second transmission paths,
   wherein said protection execution unit confirms whether or not protection processing is being executed by said one transmitter and said first and second transmitters when the bandwidth of said first or second transmission paths acquired by said band monitoring unit decreases below a threshold, and executes protection processing for said first or second transmission path which is determined to have a bandwidth smaller than the threshold only when said one transmitter and said first and said second transmitters are not executing protection processing.

2. The data transmission system according to claim 1, wherein said threshold is smaller than a bandwidth of the entire transmission paths to which said plurality of transmitters are connected in a ring configuration, and is larger than the bandwidth divided by the number of said plurality of transmitters.

3. The data transmission system according to claim 1, wherein each of said plurality of transmitters further comprises a traffic amount monitoring unit for measuring the amounts of traffic on said first and second transmission paths, respectively, at regular time intervals,
   wherein said protection execution unit compares the bandwidth of each of said first and second transmission paths acquired by said band monitoring unit with the threshold determined by the most recent traffic amount on said each transmission path acquired by said traffic amount monitoring unit at the time the bandwidth is acquired.

4. The data transmission system according to claim 1, wherein said protection execution unit releases protection processing that is being executed when the bandwidth of the transmission path that is subjected to protection processing being executed reaches the threshold or a value larger than the threshold after protection processing has been executed in said transmitter.

5. The data transmission system according to claim 1, wherein when confirming whether or not protection processing is being executed, when said protection execution unit determines that any one of said transmitter or other transmitters are executing the protection, said protection execution unit maintains a state of waiting to execute protection processing for said first or second transmission path which is determined to have a bandwidth smaller than the threshold until protection processing that is being executed is released.

6. A transmitter for making up a transmission path in a ring configuration together with a plurality of other transmitters, said transmitter comprising:
   a band monitoring unit for monitoring bandwidths of a first and a second transmission path between said transmitter and a first and a second transmitter on both sides of said transmitter, respectively; and
   a protection execution unit for executing protection processing by setting up a bypass path for each of said first and second transmission paths,
   wherein said protection execution unit confirms whether or not protection processing is being executed by said transmitter and said plurality of other transmitters when the bandwidth of said first or second transmission path acquired by said band monitoring unit decreases below a threshold, and executes protection processing for said first or second transmission path which is determined to have a bandwidth smaller than the threshold only when said one transmitter and said first and said second transmitters are not executing protection processing.

7. The transmitter according to claim 6, wherein said threshold is smaller than a bandwidth in the entire transmission paths in a ring configuration, and is larger than the bandwidth divided by the number of said plurality of transmitters.

8. The transmitter according to claim 6, further comprises a traffic amount monitoring unit for measuring the amount of traffic on said first and second transmission paths, respectively, at regular time intervals,
   wherein said protection execution unit compares the bandwidth of each of said first and second transmission paths acquired by said band monitoring unit with the threshold determined by the most recent traffic amount on said each transmission path acquired by said traffic amount monitoring unit at the time the bandwidth is acquired.

9. The transmitter according to claim 6, wherein said protection execution unit releases protection processing that is being executed when the bandwidth of the transmission path that is subjected to protection processing being executed reaches the threshold or a value larger than the threshold after protection processing has been executed in said transmitter.

10. The transmitter according to claim 6, wherein when confirming as to whether or not protection processing is being executed, when said protection execution unit determines that any one of said transmitter or other transmitters is executing the protection, said protection execution unit maintains a state of waiting to execute protection processing for said first or second transmission path which is determined to have a bandwidth smaller than the threshold until protection processing that is being executed is released.

11. A method of controlling protection processing in a transmitter for making up a transmission path in a ring configuration together with a plurality of other transmitters, said method comprising:
   a bandwidth monitoring step for monitoring bandwidths of a first and a second transmission path between said transmitter and a first and a second transmitter on both sides of said transmitter, respectively; and
   a protection execution step for executing protection processing by setting up a bypass path for each of said first and second transmission paths,
   wherein said protection execution step includes the step of confirming whether or not protection processing is being executed for each of said first and second transmission paths by said transmitter and said plurality of other transmitters when the acquired bandwidth of each said transmission path decreases below a threshold on said transmission path, and executing protection processing for said transmission path only when said one transmitter and said first and said second transmitters are not executing protection processing.

12. The protection control method according to claim 11, further comprising the step of releasing protection processing that is being executed when the bandwidth of the transmission path subjected to protection that is being executed reaches the threshold or larger after protection processing has been executed in said transmitter.

* * * * *